Figure 1:
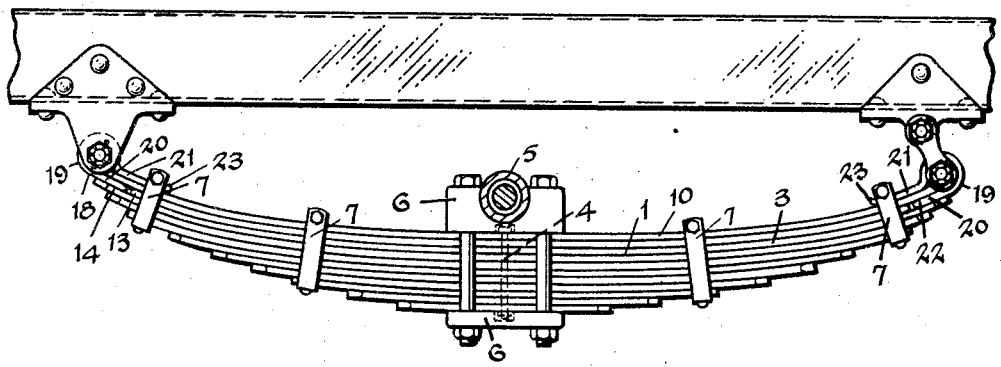

March 7, 1933.　　　R. W. NILSSON　　　1,900,841

SPRING CONSTRUCTION

Filed April 11, 1932

Inventor
Robert W. Nilsson
By Fawit F. Crampton
Attorney

Patented Mar. 7, 1933

1,900,841

UNITED STATES PATENT OFFICE

ROBERT W. NILSSON, OF TOLEDO, OHIO, ASSIGNOR TO THE MATHER SPRING COMPANY, OF TOLEDO, OHIO, A CORPORATION OF OHIO

SPRING CONSTRUCTION

Application filed April 11, 1932. Serial No. 604,447.

My invention relates to vehicle leaf springs and particularly to the eye construction for connecting the spring to the supporting frame of the vehicle. The eyes of leaf springs are subjected to forces other than that which is caused by the vertical pressure due to the weight of the load and its recoil, since there is present the torsional forces transmitted through the springs in driving and braking an automotive vehicle and lateral forces due to changing in direction of movement of the vehicle. Such torsional and lateral forces cooperate to produce fatigue in the metal that results in breakage of the upper leaf at the eye. The forces tend to open and close the eye and produce fatigue of the metal of the leaf having the eye beginning at the eye and progressively extending across the eye and final fracture of the eye. To safeguard against accident it is common to extend the second leaf and bend it over the eye to partially wrap the end of the second leaf about the eye, leaving however, sufficient play to permit free sliding of the upper and second spring leaves relative to each other. Such a construction, however, does not safeguard the spring against breakage at the eye, but provides a means for preventing total disability of the connection. When the eye is broken in such a construction the second leaf provides a temporary sustaining means to enable continuance of the vehicle with some safety until the spring can be replaced.

My invention provides a reinforcement of the eye without preventing the free movement of the leaves and thus strengthens the ends of the top leaf of the spring at the eyes sufficient to withstand all the forces that are transmitted through the springs, and at the same time provides for the free movement of the leaves of the spring.

The invention consists in other features which will appear from the following description and upon examination of the drawing. Structures containing the invention may partake of different forms and may be varied in their details and still embody the invention. To illustrate a practical application of the invention I have selected a spring embodying the invention and a modification thereof as an example of the various structures and the details of such structures that contain the invention and shall describe the selected structure hereinafter, it being understood that variations may be made and that certain features of my invention may be used to advantage without a corresponding use of other features of the invention and without departing from the spirit of the invention. The particular spring structure selected is shown in the accompanying drawing.

Figure 2:
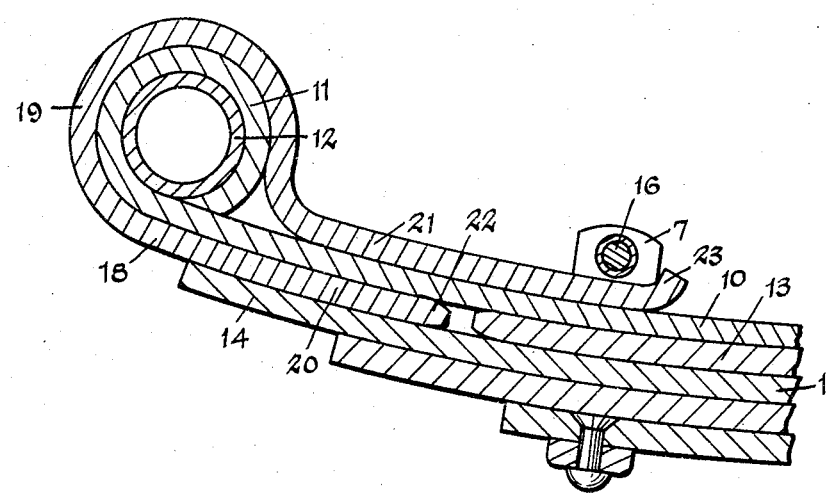

Fig. 1 illustrates a side view of the spring containing the invention. Fig. 2 illustrates an enlarged view of a longitudinal section of an end portion of the spring shown in Fig. 1.

The springs containing my invention are formed of a plurality of leaves 3 of different lengths that are secured together by means of the bolt 4 and connected to an axle 5 by suitable clamps 6 in a manner well known in the art. The leaves are also connected together by suitable clips 7 that operate to tie the leaves and at the same time permit sliding movement of one relative to the other when the spring flexes.

The longer leaf 10 of the spring is provided with the usual eyes 11 at its ends. It is curved cylindrically about the usual bushing 12 in the manner well known in the art. In the form of construction shown in Figs. 1 and 2, the second leaf 13 is considerably shorter than the top or first leaf, while the third leaf 14 extends to a point approximate the vertical through the axis of each eye and has a length commonly found in the leaves contiguous to the longest leaves of the ordinary springs. Between the first and third springs, that is, the top spring and the third spring from the top, there is located a bar 18 formed of spring metal and having the usual curvature of the end portions of the spring leaves. It is bent centrally to tightly fit around the eye and it has a returned portion bent to conform to the curvature of the end portion of the leaf 10 of the spring. The returned portion is located on top of the leaf 10 and extends through one of the clips 7. The second leaf 13 preferably extends to a point beyond the outer clips 7 and intermediate the eye 11 and the ends of the leaf 14 and contiguous to the end of the bar 18.

The bar 18 has a cylindrical bent portion 19 that fits the exterior surface of the eye 11. It also has the end portions 20 and 21 that conform to the curvature of the upper and lower surfaces of the top leaf 10. They are bent to fit the end of the top spring. The portion 20 of the bar 18 fits between the leaves 10 and 14 of the spring and terminates at a point 22 that is sufficiently distant from the end of the leaf 13 to permit flexing and sliding movement of the leaf 13 relative to the leaves 10 and 14 without abutting the end of the bar 18. The portion 21 of the bar 18 extends to a point so as to be enclosed within the end clip 7. The bar 18 is preferably provided with an upturned end portion 23 that is located at a point sufficiently remote from the bolt 16 of the clip 7 to prevent engagement of the upturned end portion with the bolt 16 of the clip 7 even though the spring is extremely deflected.

Thus, the reinforcing bar 18 greatly strengthens the eye and yet enables freedom of movement of the leaves and of the reinforcing member and consequently prevents fatigue in the ends of the top spring and in the reinforcing part.

One or both eyes of the spring may be reinforced, as described. The damaging forces are often concentrated in one eye only. In such cases a conventional construction may be used on the end of the spring which is subjected to the normal load carrying forces and the eye that receives the greater strains may be reinforced by the use of the bent bar 18.

I claim:

1. In a leaf spring, one of the outer leaves of the spring having an eye, a bar having an end portion located between two leaves of the spring, a cylindrical portion surrounding the eye and an inwardly extending end portion located in contact with the surface of the leaf having the eye.

2. In a leaf spring, one of the outer leaves of the spring having an eye, a bar having an end portion located between the said leaf and a second leaf, a third leaf located between the said leaves, the bar having a cylindrical portion surrounding the eye and an end portion located in contact with the outer surface of the leaf having the eye, the inner end of the bar located in spaced relation to the end of the leaf located between the same leaves that the first named end portion of the bar is located.

In witness whereof I have hereunto signed my name to this specification.

ROBERT W. NILSSON.